(12) United States Patent
Cyren et al.

(10) Patent No.: US 9,939,064 B2
(45) Date of Patent: Apr. 10, 2018

(54) ROTARY SHIFT ACTUATOR FOR A SHIFT-BY-WIRE TRANSMISSION

(71) Applicants: Bengt Cyren, Svanesund (SE); Bengt Hermansson, Mullsjö (SE); Tomas Wykman, Jönköping (SE)

(72) Inventors: Bengt Cyren, Svanesund (SE); Bengt Hermansson, Mullsjö (SE); Tomas Wykman, Jönköping (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 382 days.

(21) Appl. No.: 14/648,592

(22) PCT Filed: Nov. 30, 2012

(86) PCT No.: PCT/EP2012/074053
§ 371 (c)(1),
(2) Date: May 29, 2015

(87) PCT Pub. No.: WO2014/082676
PCT Pub. Date: Jun. 5, 2014

(65) Prior Publication Data
US 2015/0337957 A1    Nov. 26, 2015

(51) Int. Cl.
*F16H 63/00* (2006.01)
*F16H 63/30* (2006.01)
(Continued)

(52) U.S. Cl.
CPC ......... *F16H 63/3013* (2013.01); *F16H 61/32* (2013.01); *F16H 2057/0213* (2013.01);
(Continued)

(58) Field of Classification Search
CPC ............... F16H 63/3013; F16H 61/32; F16H 2057/0213; F16H 2057/0221; F16H 2061/326
(Continued)

(56) References Cited

U.S. PATENT DOCUMENTS 4,050,130 A    9/1977  Pitner
4,529,143 A *  7/1985  Kanada ................... B60R 22/44
                                                          242/375.3
(Continued)

FOREIGN PATENT DOCUMENTS

DE    1927741     * 12/1969
DE    1763058 A1   8/1971
(Continued)

OTHER PUBLICATIONS

English language abstract not found for DE1763058. However see English translation extracted from espacenet.com database on May 29, 2015, 4 pages.
(Continued)

*Primary Examiner* — William C Joyce
(74) *Attorney, Agent, or Firm* — Howard & Howard Attorneys PLLC (57) ABSTRACT

A compact and efficient rotary shift actuator for a shift-by-wire transmission includes a motor having a motor shaft that is rotatable about a motor axis, an output head arranged towards a second end of an output lever and adapted for connection with a shift shaft of a transmission, and a gear train for transferring torque from the motor shaft to the output head. The gear train comprises a first shaft rotatable about a first axis, a second shaft rotatable about a second axis, and the output lever pivotable about a lever axis. The gear train further includes a worm gear for transmitting torque from the first shaft to the second shaft.

13 Claims, 8 Drawing Sheets

(51) Int. Cl.
*F16H 61/32* (2006.01)
*F16H 57/021* (2012.01)
*F16H 57/022* (2012.01)
*F16H 61/28* (2006.01)

(52) U.S. Cl.
CPC ............... *F16H 2057/0221* (2013.01); *F16H 2061/2892* (2013.01); *F16H 2061/326* (2013.01); *Y10T 74/2003* (2015.01)

(58) Field of Classification Search
USPC ................ 74/421 A, 425, 473.12, 606 R
See application file for complete search history.

(56) References Cited

U.S. PATENT DOCUMENTS

| | | | |
|---|---|---|---|
| 5,169,245 A | 12/1992 | Harada et al. | |
| 5,676,365 A * | 10/1997 | Pittelkow | B65H 3/5215 271/121 |
| 6,393,929 B1 * | 5/2002 | Quere | F16H 1/16 74/411 |
| 6,484,598 B2 | 11/2002 | Peter | |
| 6,550,351 B1 | 4/2003 | O'Reilly et al. | |
| 6,918,314 B2 | 7/2005 | Wang | |
| 7,051,611 B2 * | 5/2006 | Fauth | B21H 5/005 29/893.32 |
| 7,337,758 B2 * | 3/2008 | Sturdy | F02D 9/1065 123/184.53 |
| 7,421,244 B2 | 9/2008 | van Rooyen | |
| 8,141,925 B2 * | 3/2012 | Mizuno | B25J 9/102 294/106 |
| 2002/0045506 A1 | 4/2002 | Scheuerer | |
| 2006/0078241 A1 | 4/2006 | Moehring | |
| 2006/0278029 A1 | 12/2006 | Burgbacher | |
| 2009/0243600 A1 * | 10/2009 | Itomi | G01D 5/145 324/207.25 |
| 2011/0126657 A1 | 6/2011 | Ganter et al. | |
| 2012/0137800 A1 | 6/2012 | Park et al. | |

FOREIGN PATENT DOCUMENTS

| | | |
|---|---|---|
| DE | 29513699 U1 | 9/1996 |
| DE | 19628520 A1 | 1/1998 |
| DE | 19714237 C1 | 10/1998 |
| DE | 19904021 A1 | 8/1999 |
| DE | 10232426 A1 | 2/2003 |
| DE | 10241877 A1 | 3/2004 |
| EP | 1001193 A2 | 5/2000 |
| EP | 1101652 A1 | 5/2001 |
| EP | 1645761 A2 | 4/2006 |
| KR | 20090049258 A | 5/2009 |

OTHER PUBLICATIONS

English language abstract and translation for DE19628520 extracted from espacenet.com database on Dec. 3, 2015, 9 pages.
English language abstract not found for DE19714237. However see English translation extracted from espacenet.com database on Dec. 3, 2015, 5 pages.
English language abstract and translation for DE19904021 extracted from espacenet.com database on Dec. 3, 2015, 28 pages.
English language abstract and translation for DE10232426 extracted from espacenet.com database on Dec. 3, 2015, 9 pages.
English language abstract not found for EP1645761. However see English language Equivalent US20060078241A1.
English language abstract not found for DE10241877. However see English language Equivalent US20060278029A1.
English language abstract not found for DE29513699(U1). However see English translation extracted from espacenet.com database on Dec. 3, 2015, 5 pages.
English language abstract not found for KR20090049258(A). However see English translation extracted from espacenet.com database on Dec. 3, 2015, 5 pages.
International Search Report for International Application PCT/EP2012/074053 dated Apr. 26, 2013.

* cited by examiner

ROTARY SHIFT ACTUATOR FOR A SHIFT-BY-WIRE TRANSMISSION

CROSS-REFERENCE TO RELATED APPLICATIONS

The subject patent application claims priority to and all the benefits of Patent Application No. PCT/EP2012/074053, which was filed on Nov. 30, 2012 with the European Patent Office, the disclosure of which is/are hereby incorporated by reference.

BACKGROUND OF THE DISCLOSURE

The following invention relates to a rotary shift actuator for a shift-by-wire transmission comprising a motor having a motor shaft that is rotatable about a motor axis, an output head arranged towards a second end of an output lever and adapted for connection with a shift shaft of a transmission and a gear train for transferring torque from the motor shaft to the output head, wherein the gear train includes a first shaft rotatable about a first axis, a second shaft rotatable about a second axis and the output lever pivotable about a lever axis and wherein the gear train further a plurality of torque transmitting mechanisms configured to transmit torque from the motor shaft to the first shaft, from the first shaft to the second shaft and from the second shaft to the output lever.

SUMMARY OF THE DISCLOSURE

Today, many vehicles employ an automatic or a semi-automatic transmission. A shift signal from a user of a vehicle or from a control system of a vehicle has to be translated into a rotation of a shift shaft of a transmission. A shift shaft is a shaft extending out of a transmission that can be used to change the modes of the transmission. An automatic transmission typically has a Park mode, a Reverse mode, a Neutral mode and a Drive mode. Commonly, a shift shaft is rotated from the Park mode over the Reverse and the Neutral mode to the Drive mode.

It is a common issue of all rotary shift actuators that a high torque is required for rotating the shift shaft about a limited angle of e.g. about 50°. The torque is commonly provided via a gear train by an electric motor having a low torque. The torque available at the output head does, however, scale with the gear ratio provided by the gear train. Hence, the gear train has to provide a sufficient gear ratio to transform many rotations of the motor shaft to the limited angle rotation of the output head with a torque necessary for shifting between the modes of a transmission.

A high gear ratio between two shafts can only be achieved by providing a gear or similar component with large radius on one of the shafts and a gear or similar component with a small radius on the other shaft. In consequence, higher gear ratios require greater distances between the shafts which do in turn lead to an increase of the overall dimensions of the rotary shift actuator. Hence, efficient rotary shift actuators with a high gear ratio between the motor and the output head tend to be rather bulky and heavy. However, space and weight requirements are rather tight in modern vehicles wherefore many prior art rotary shift actuators are either compact or efficient.

U.S. 2011/0126657 A1 discloses a rotary shift actuator comprising two motors having a motor spur gear. The motor spur gears are each rotatable about a first and a second motor axis. The first and the second motor axis extend in parallel to one anther. The rotary shift actuator further comprises an output head for connection to a shift shaft of a transmission. The rotation or torque of the motor shaft of the first and the second motor is transmitted to the output head via a gear train. The gear train comprises a first shaft that is rotatable about a first axis a second shaft that is rotatable about a second axis and an output lever that is pivotable about a lever axis. The first motor axis, the second motor axis, the first and the second shaft axis and the output lever axis all extend in parallel. Hence, said rotary shift actuator comprises a rather bulky design.

A further rotary shift actuator for a shift-by-wire transmission is known from U.S. Pat. No. 6,550,351 B1. The rotary shift actuator comprises a motor having a motor shaft that is rotatable about a motor axis. The torque of the motor is transmitted via a gear train to an output head. The gear train comprises a first shaft rotatable about a first shaft axis, a second shaft rotatable about a second shaft axis and an output lever pivotable about a lever axis. The first axis, the second axis and the lever axis are all extending perpendicular to the motor axis.

Another rotary shift actuator is known from U.S. 2002/0045506 A1. The rotary shift actuator comprises a motor with a motor shaft rotatable about a motor axis and an output head connected with a shift shaft of a transmission. Torque from the motor shaft is transmitted via a worm gear and a planetary gear system to the output head. Further rotary shift actuators comprising gear trains based on a planetary gear system are known from a U.S. Pat. No. 6,918,314 B2, U.S. Pat. No. 6,484,598 B2 and U.S. Pat. No. 7,241,244 B2.

In DE 10 232 426 A1 a rotary shift actuator is disclosed comprising a motor having a bevel motor spur gear that is rotatable about a motor axis. The bevel motor spur gear is connected to an output head for connection with a shift shaft of a transmission to a gear train. The gear train comprises a first shaft rotatable about a first axis, a second shaft rotatable about a second axis and an output lever pivotable about a level axis. The first axis, the second axis and the lever axis are all extending perpendicular to the motor axis.

In view of the foregoing, it would be desirable to provide a compact and efficient rotary shift actuator for a shift-by-wire transmission.

One non-limiting example of a rotary shift actuator includes a torque transmitting mechanism, which is configured to transmit torque from the first shaft to the second shaft and is formed as a worm gear. The worm gear can be any embodiment of a worm gear known in the art.

The non-limiting example of a rotary shift actuator for a shift-by-wire transmission has a compact and efficient design that provides a high gear ratio between the output head and the motor shaft. One example of the torque transmitting mechanism between the first shaft and the second shaft can be a worm gear. The dominating lateral extension of second and third torque transmitting mechanisms can be arranged perpendicular to the dominating lateral extension of the first torque transmitting mechanism. An overlap between other elements of the rotary shift actuator and the torque transmitting mechanisms results in a compact design with a high gear ratio.

The torque transmitting mechanisms can include at least two components, each of the two components or elements being attached to one of the shafts. Exemplary embodiments of a component within the meaning of this application are spur gears, cylindrical pinion gears, crown gears, bevel gears and the like. The term component does, however, not necessarily refer to a separate entity. A component may as well be formed integrally with a shaft or simply refer to the surface of a shaft. Two components of a torque transmitting mechanism are connected either directly i.e. are in meshing engagement with one another or through further components like a belt mechanism or a chain mechanism.

In a preferred embodiment the worm gear is formed by a cylindrical pinion gear attached to the first shaft and a crown gear attached to the second shaft, wherein the cylindrical pinion gear is in meshing engagement with the crown gear. It is, however, also conceivable that in an alternative embodiment the crown gear is attached to the first shaft and the cylindrical pinion gear is attached to the second shaft. Employing a crown gear is especially advantageous as it allows for a higher gear ratio between two shafts if the maximum distance between the shafts is limited compared to other embodiments of worm gear.

One example of the rotary shift actuator includes the motor axis extending parallel to the first axis and perpendicular to the second axis, which in turn extends parallel to the lever axis. It is further preferred to arrange the motor axis and the first axis between the second axis and the lever axis. Another example of the rotary shift actuator includes the first axis arranged between the motor axis and the second axis. These exemplary arrangements of axes allow for an increasingly compact design of the rotary shift actuator providing for an optimal distribution of the large components of the torque transmission means. At the same time, the effective length of the output lever is maximized as it covers the full distance across the first shaft and the motor allowing for a maximum torque at the output head.

One non-limiting example of the torque transmitting mechanism that is configured to transmit torque from the second shaft to the output lever is formed by a toothed end face formed at a first end of the output lever and a second spur gear attached to the second shaft, and the toothed end face is in meshing engagement with the second spur gear. The output lever with a toothed end face is, essentially, a section of spur gear whose radius corresponds to the distance of the toothed end face from the output lever axis. Hence, the torque transmitting mechanism can include a second spur gear with a small radius and a toothed end face at a first end of the output lever of the radius, so as to provide a very high gear ratio between the second shaft and the output head.

Another example of the rotary shift actuator includes the spur gear, which is attached to the second shaft and is a variable radius gear. The toothed end face of the output lever is further arranged on a variable radius about the lever axis, such that the distance between the second axis and the lever axis is constant when rotating the second shaft and pivoting the output lever while the variable radius gear and the end face remain in meshing engagement. In other words, the radius of the variable radius gear and the size of the output lever are matched, such that the gear ratio achieved by the gear train is variable when the output lever is pivoted.

One example of the variable radius gear has a first section having the smallest radius and a second section having the largest radius. The first and the second section are arranged adjacent to one another and the radius of the variable radius gear increases from the first to the second section. In other words, the first section and the second section are separated by nearly 360° in either clockwise or counterclockwise direction and by a very small gap in the opposite direction. When rotating the second shaft from the first section to the second section, the radius of the variable radius gear increases continuously or gradually. The radius of the variable radius gear increases from the first section to the second section and, accordingly, the gear ratio achieved by the gear train constantly decreases. This exemplary variable radius gear provides a higher shifting force in the first section e.g. for shifting into a Park mode and a longer shifting distance when less force is required for shifting e.g. into a Drive mode at the other end of the shift axis positions. In an exemplary embodiment, the radius of the variable radius gear can be described approximately by a sigmoid function.

The non-limiting example of the rotary shift actuator includes a gear catch formed by a step on the variable radius gear where the first section and the second section are adjacent to one another. The output lever further includes a side face and an elongated tooth on the end face, and the side face and the elongated tooth delimit the end face on opposing sides. The gear catch, the elongated tooth and the side face are arranged such that the gear catch can engage with the side face, when the first section engages with the end face, and such that the gear catch can engage with the elongated tooth, when the second section engages with the end face, thereby delimiting the rotation of the second gear train shaft.

In other words, a gear catch is formed by the step on the outer surface of the variably radius gear that is arranged where the first section is right next to the second section i.e. where the smallest and the largest radius are adjacent to one another. On the output lever the toothed end face is delimited on one side by an elongated tooth. On the other side, the end face does not have any limiting tooth but continues into the side face of the output lever. When the first section i.e. the section with the smallest radius of the variable radius gear is in meshing engagement with the end face of the output lever, the side face engages with the gear catch or step between the first section and the second section.

The side face is the outer surface of the output lever extending between the end face and the output head. When the side face engages with the gear catch any direct rotation from the first section to the second section is prohibited. The shift shaft is actively limited from rotating to regions that could damage the transmission. When the second section i.e. the section with the largest diameter or radius is in engagement with the end face of the output lever, the elongated tooth engages with the gear catch or step between the second section and the first section. Hence, a rotation directly from the second section to the first section is prohibited. The transmission is, thereby, protected from any excessive rotation of the shift shaft that could damage it.

A simple but efficient transmission of torque from the motor shaft to the first shaft can be provided by the torque transmitting mechanism configured to transmit torque from the motor shaft to the first shaft in the form of a motor spur gear attached to the motor shaft and a first spur gear attached to the first shaft, and the first spur gear is in meshing engagement with the motor spur gear. The first shaft can be a cylindrical shape and mounted in two tube-shaped bushings, such that the first shaft can be displaced in a direction of the first axis. In other words, the motor spur gear and the worm gear do not prohibit a motion or displacement of the first shaft along the first axis. While this motion or movement is unintended it may nevertheless occur due to excessive forces that tend to displace the first shaft and might, if transferred to the motor shaft, damage the motor.

The first and/or second end of the first shaft is arranged adjacent to a first and/or a second resilient element, such that the first shaft is pushed back into a central position by the first or the second resilient element when moving along the first axis towards the first and/or the second resilient element. In this example, the first resilient element is formed as a first plate spring, which extends in a plane perpendicular to the first axis and that the second resilient element is formed as a second plate spring, and the second plate spring extends in a plane perpendicular to the first axis. The first and/or second end can be cupola shaped or dome-shaped.

In this example, the first shaft can be pushed out of its neutral position and pushed back into its original position once the force is gone, such that an optimal transmission of the rotation from the motor spur gear to a first shaft is restored. In another example, the first shaft can be spaced apart from the resilient elements, such that there are no friction losses between the first shaft and the resilient elements. Forming the resilient elements as plate springs and the ends of the first shaft cupola shaped or dome-shaped is especially advantageous, as the friction losses are small, even if the first shaft is in contact with one or both of the resilient elements.

The exemplary rotary shift actuator is arranged in a housing, the housing comprising a cover, a central element and a base. The cover can be sealed to the central element by a gasket or a sealing. Arranging a sealing between the cover and the central element is advantageous as a sealed compartment is provided within the rotary shift actuator housing in which sensitive elements like electronics and/or the motor can be arranged free from environmental stress like dirt, water or grease.

The base of the housing can be configured to mount the rotary shift actuator to a transmission. This allows for an easy and efficient mounting of the rotary shift actuator next to the transmission.

Another example of the rotary shift actuator can include a magnet mounted onto an end of the second shaft, such as the crown gear, and the magnet can be arranged such that the poles of the magnet extend along an axis perpendicular to a second axis. The rotary shift actuator can further include a device configured to sense the orientation of the magnet. The magnet and the device for sensing the orientation of the magnet can be arranged in the sealed compartment of the housing. In other words, the magnet can be mounted onto the second shaft such that its magnetic field performs a detectable rotation by 360° when the second shaft rotates by 360°. The arrangement of the magnet on the second shaft allows for a precise measurement of the state of the rotary shift actuator. The device can be an angular magnet sensor of e.g. Hall-type which can also be referred to as an electronic compass.

This example of the rotary shift actuator includes the magnet disposed on the second shaft as it rotates by 360° when the shift shaft is rotated from end to end. The motor spur gear of the motor and the first shaft rotate in the same time for more than 360° and do not allow for an unambiguous result of the position measurement. The output lever on the other hand rotates only about a limited angle of e.g. 50°. Hence, the same magnet and the same device for sensing the orientation of the magnet could only deliver the position of the rotary shift actuator with less precision.

BRIEF DESCRIPTION OF THE DRAWINGS

An exemplary embodiment of the invention will now be described, with reference to the accompanying drawings of which.

DETAILED DESCRIPTION OF THE DRAWINGS

The basic layout of an exemplary embodiment of the present invention will now be described with reference to FIGS. 1 to 6. In all Figures like numerals refer to like elements.

One non-limiting example of a rotary shift actuator 1 includes a motor 3 having a motor shaft 4 and a motor spur gear 5 attached to the motor shaft 4. The motor 3 can be an electric motor, but is also conceivable that a hydraulic motor is used. The motor 3 includes electric contact means 7 to control its rotation. The motor shaft 4 and the motor spur gear 5 of the motor 3 are rotatable about a motor axis 9.

The motor spur gear 5 is in engagement with a first spur gear 11 attached towards a first end 13 of a first shaft 15. The motor spur gear 5 and the first spur gear 11 form one torque transmitting mechanism 5, 11 configured to transmit torque from the motor shaft 4 to the first shaft 15. The first shaft 15 is rotatable about a first axis 17 that extends parallel to the motor axis 9. Towards the second end 19 of the first shaft 15 a cylindrical pinion gear 21 is attached. The first shaft 15 is of cylindrical shape and mounted in tube-shaped or tubular bushings 23, 23'. Advantageously, the first shaft 15 can be displaced for a short distance sideways along the first axis 17 if a force tending to displace the first shaft 15 along the first axis 17 acts onto the first shaft 15. The force is thereby advantageously absorbed but not transmitted onto the motor spur gear 5 and the motor 3. The first and the second end 13, 19 of the first shaft 15 are cupola or dome-shaped.

The cylindrical pinion gear 21 is in meshing engagement with a crown gear 25 that is attached to the first end 27 of a second shaft 29. Essentially, a worm gear 21, 25 is formed by the cylindrical pinion gear 21 and the crown gear 25. The worm gear 21, 25 provides a torque transmitting mechanism 21, 25 configured to transmit torque from the first shaft 15 to the second shaft 29. The second shaft 29 is rotatable about the second axis 31 extending perpendicular to the first axis 17 and the motor axis 9. A toothed surface 33 of the crown gear 25 faces away from the first end 27 of the second shaft 29 towards a second end 35 of the second shaft 29.

Towards the second end 35 of the second shaft 29, a spur gear 37 in form of a variable radius gear 37 is attached. The variable radius gear 37 has a first section 39 having a smallest radius and a second section 41 having a largest radius. The first and the second section 39, 41 are arranged adjacent or next to one another. The radius of the variable radius gear 37 increases in either direction around the second axis 31 from the first section 39 to the second section 41. However, the radius increases in a step-like fashion from the first to the second section 39, 41 where the angular distance between the first and the second section approaches 0° and with a continuous slope in the opposite direction.

The variable radius gear 37 is in meshing engagement with a toothed end face 43 arranged at a first end 44 of an output lever 45. The second section 41 of the variable radius gear 37 and the toothed end face 43 of the output lever 45 provide a torque transmitting mechanism configured to transmit torque from the second shaft 29 to the output lever 45. The output lever 45 is rotatable or pivotable about the output axis 47. The toothed end face 43 is arranged on a variable radius about the lever axis 47 such that the distance between a second axis 31 and the lever axis 47 is constant while rotating the second shaft 29 and pivoting the output lever 45 with the toothed end face 43 and the variable radius gear 37 constantly remaining in meshing engagement. In other words, the curvature of the toothed end face 43 of the output lever matches the changing radius of the variable radius gear 37. A combination of a variable radius gear 37 and an output lever 45 with a matching toothed end face 43 is advantageous as it allows varying the gear ratio of the rotary shift actuator 1 during rotation. Thereby, a high gear ratio is provided when the variable radius gear 37 engages with the toothed end face 43 at the first section 39, i.e. for moving the transmission into reverse, and longer movements with less force or torque when the variable motor spur gear 37 engages with the second section 41 of the toothed end face 43 of the output lever 5.

In order to limit the rotation of the output lever 45 of the lever axis 47, the difference in radius between the first section 39 and the second section 41 forms a gear catch 49. The gear catch 49 is represented by the surface of the variable radius gear 37 where the first section 39 and the second section 41 are adjacent to one another. Hence, the length of the gear catch 49 is determined by the difference in radius between the first section 39 and the second section 41. A rotation directly from the first section 39 to the second section 41 is delimited by an engagement of the gear catch with a side face 51 of the output lever 45. When the second section 41 of the variable radius gear 37 engages with the toothed end face 43, an elongated tooth 43 comes into engagement with the gear catch 49. The elongated tooth restricts any further rotation of the variable radius gear 37. The delimiting combination of a gear catch 49, the side face 51 and the elongated tooth 43 is advantageous, as the rotation of the shift shaft of the transmission is restricted to a certain angle avoiding damage due to excessive rotation.

The output head 55 is located at the second end 56 of the output lever 45 and includes a recess or slot 57 that can engage with the shift shaft of a transmission. The center of the recess 57 coincides with the lever axis 47. A gear train 58 transmitting the torque from the motor shaft 4 to the output head 55 is formed by the shafts 15, 29, the output lever 45 and the plurality of torque transmitting mechanisms 5, 11, 21, 25, 37, 43 configured to transmit torque.

Figure 1:
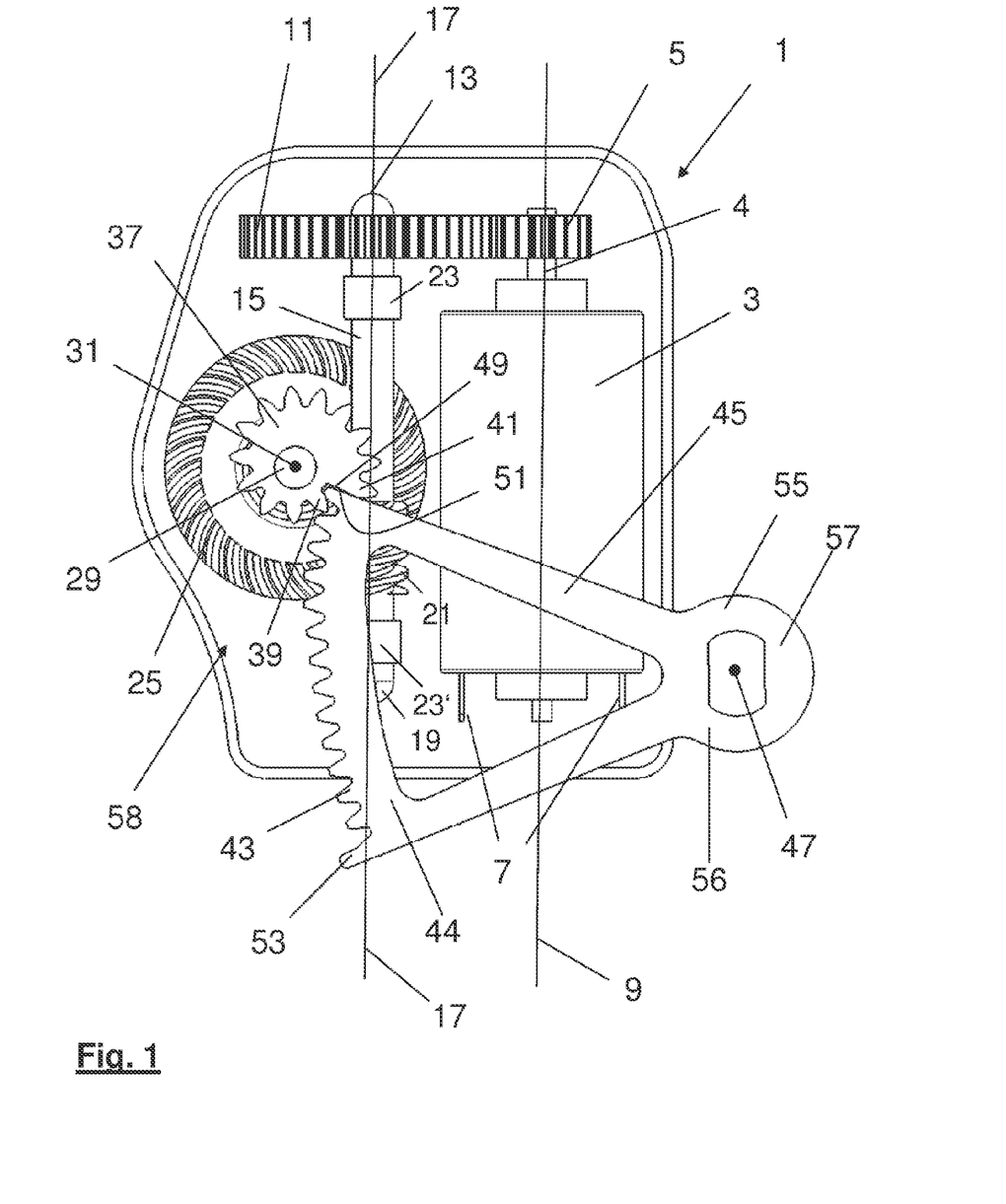
FIG. 1 shows an exemplary embodiment of a rotary shift actuator according to the present invention.
Figure 2:
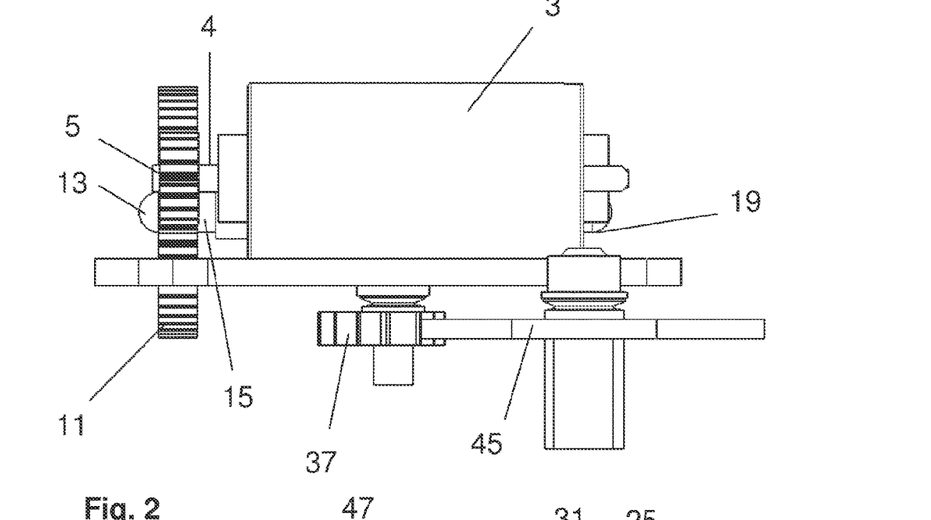
FIG. 2 shows a schematic side view of the exemplary embodiment of a rotary shift actuator.
Figure 3:
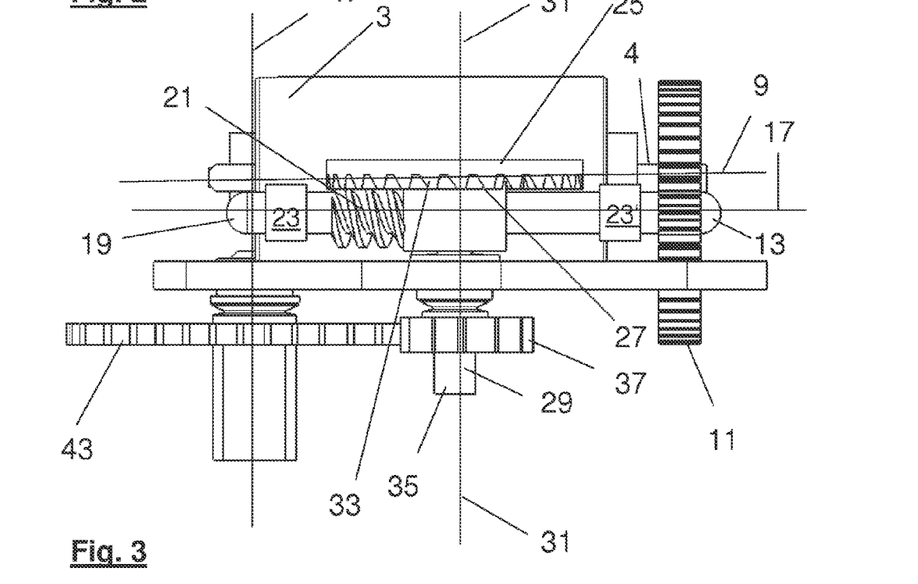
FIG. 3 shows a side view of the exemplary embodiment of a rotary shift actuator.
Figure 4:
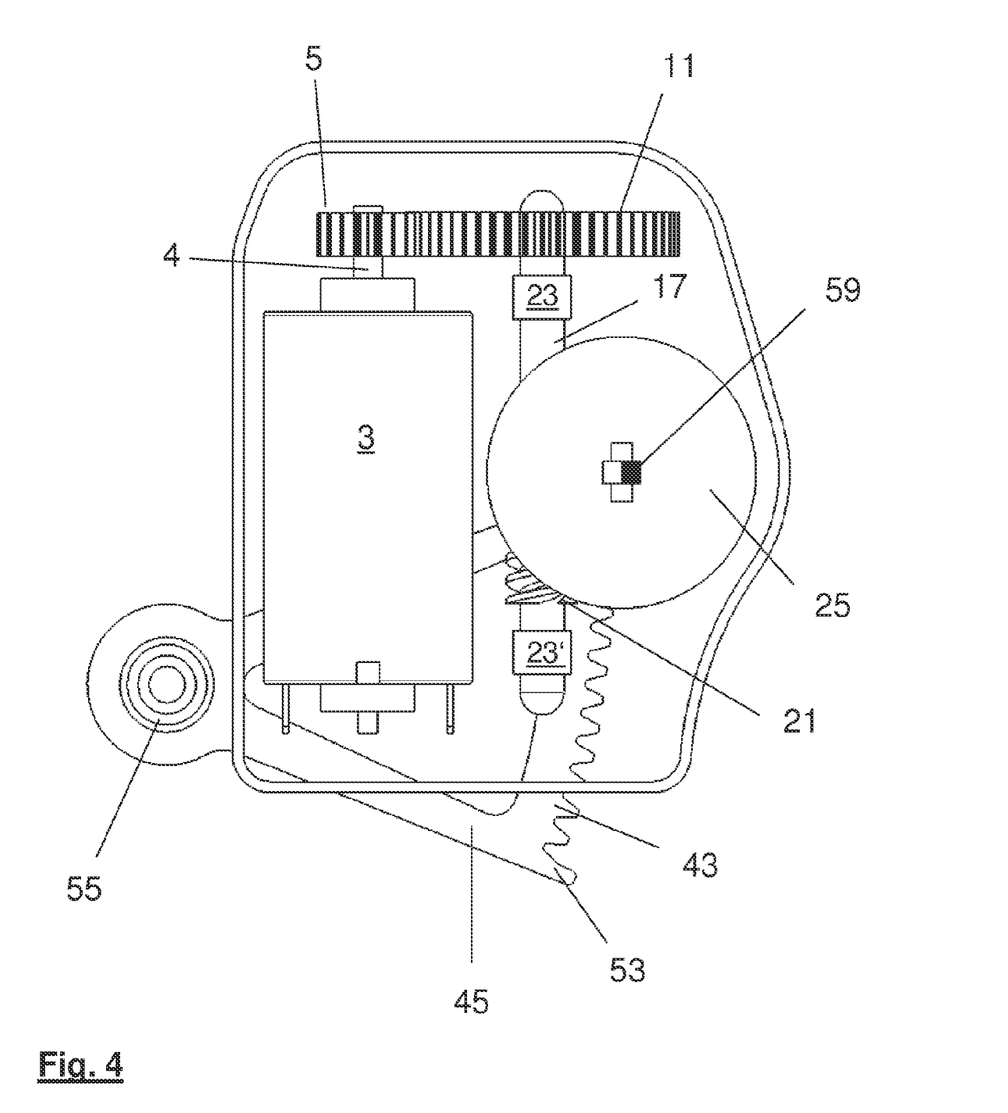
FIG. 4 shows another plane view of the exemplary embodiment of a rotary shift actuator.
Figure 5:
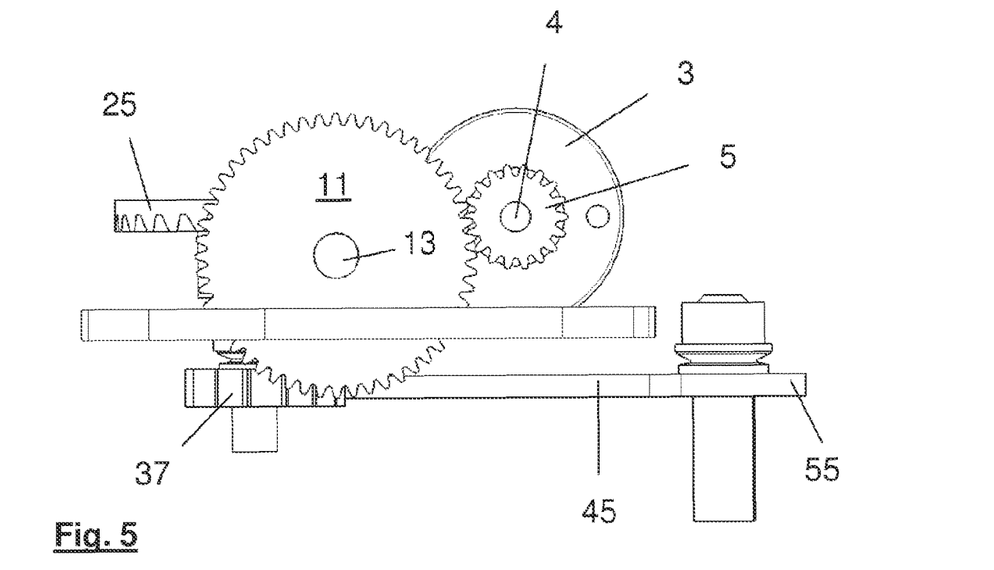
FIG. 5 shows another side view of the exemplary embodiment of a rotary shift actuator.
Figure 6:
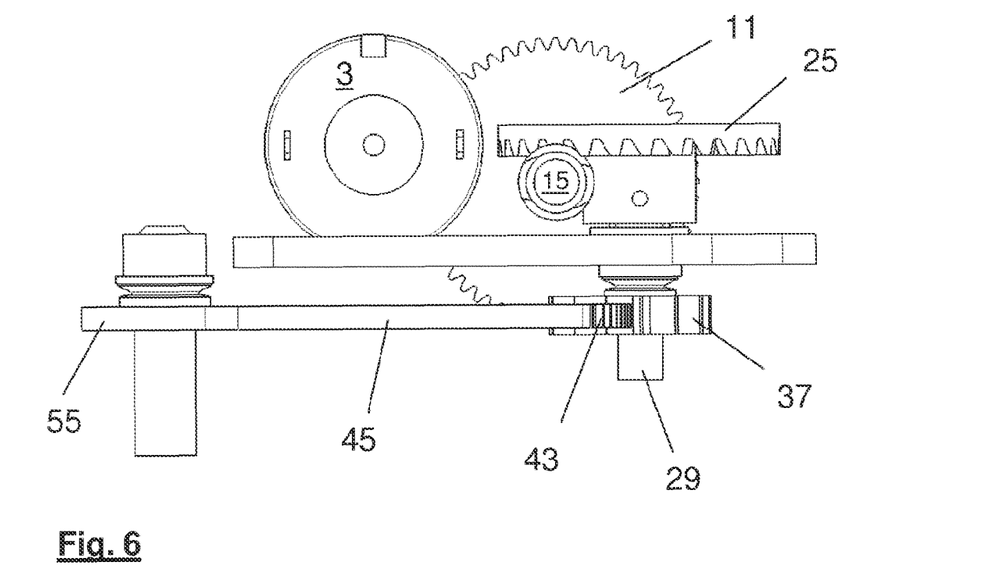
FIG. 6 shows another side view of the exemplary embodiment of a rotary shift actuator.
Figure 7:
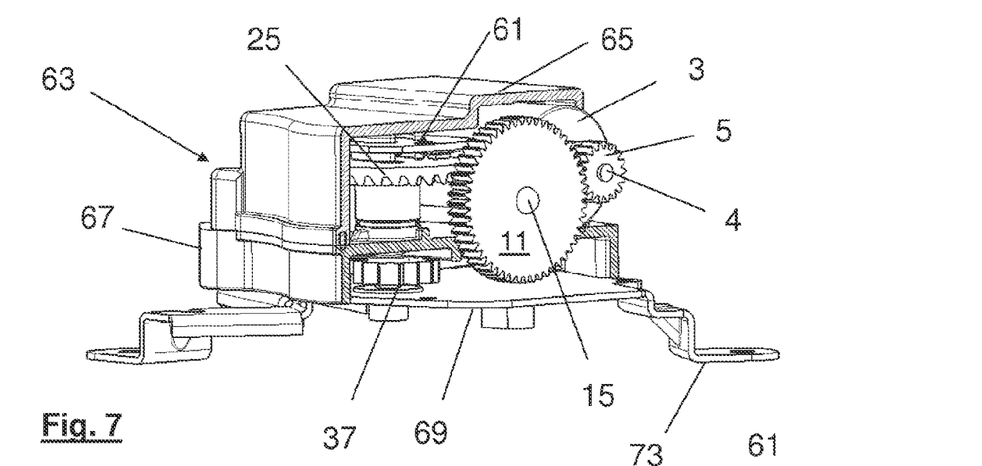
FIG. 7 shows a schematic sectional side view of the exemplary embodiment of a rotary shift actuator.
Figure 8:
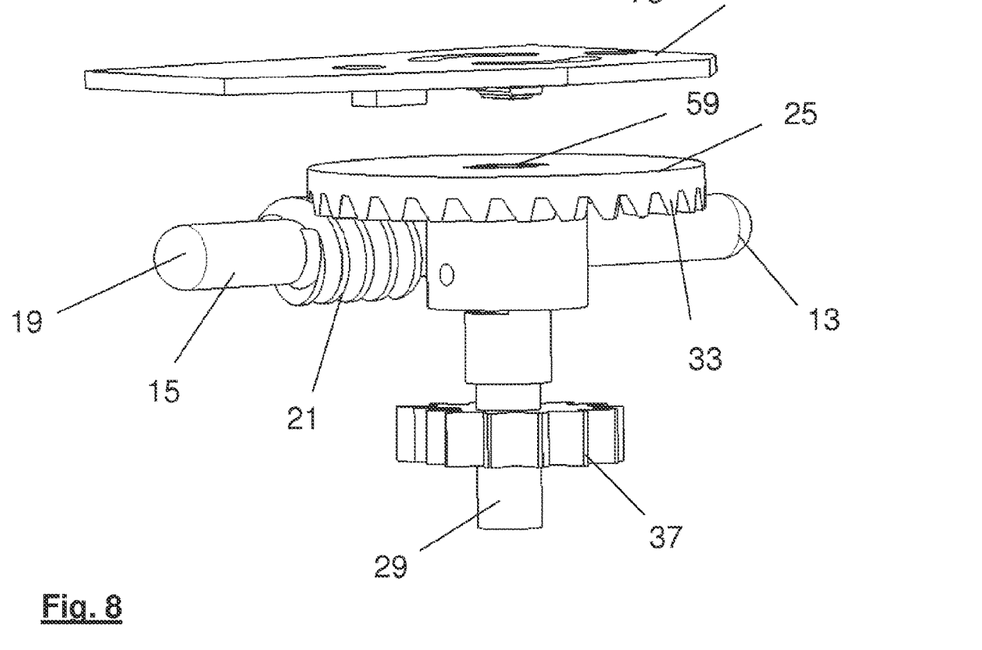
FIG. 8 shows a sensor arrangement for measuring a rotation of an output lever of the exemplary embodiment of a rotary shift actuator according to the present invention.

The exemplary embodiment of a rotary shift actuator 1 can further include a system for determining the rotation of the output lever 45 schematically shown in FIGS. 4 and 8. The system can include a magnet mounted onto the first end 27 of the second shaft 29. The first end 27 corresponds to the non-toothed surface of the crown gear 25. The magnet 59 is mounted onto the second axis 31, such that an axis pointing from a north pole of the magnet 59 to its south pole is perpendicular to the second axis 31. A device 61 configured to sense the orientation of the magnet 59 is mounted adjacent to the magnet 59, such that a rotation of the magnet 59 with the crown gear 25 can be sensed.

In this example, the magnet 59 mounted on the crown gear 25 as the crown gear 25 is rotated by nearly 360° when the output lever 45 is pivoted from one end position to the other end position by e.g. 50°. Consequently, the field of a magnet mounted on the lever axis would only be rotated by 50°. The device 61 can only sense the orientation of the magnet 59 with a given precision i.e. the relative precision of the measurement of the rotation or pivoting of the output lever 45 is higher if the magnet rotates about a larger angle. Therefore, mounting the magnet 59 onto the crown gear 25 provides for the most precise measurement of the state of the rotary shift actuator 1. The motor spur gear 5 and the first shaft 15 on the other hand rotate by more than 360° when the output lever 45 is tilted from end to end such that a measurement of the orientation of the magnetic field of a magnet mounted to either the first shaft 15 or the motor shaft 4 is ambiguous.

Figure 9:
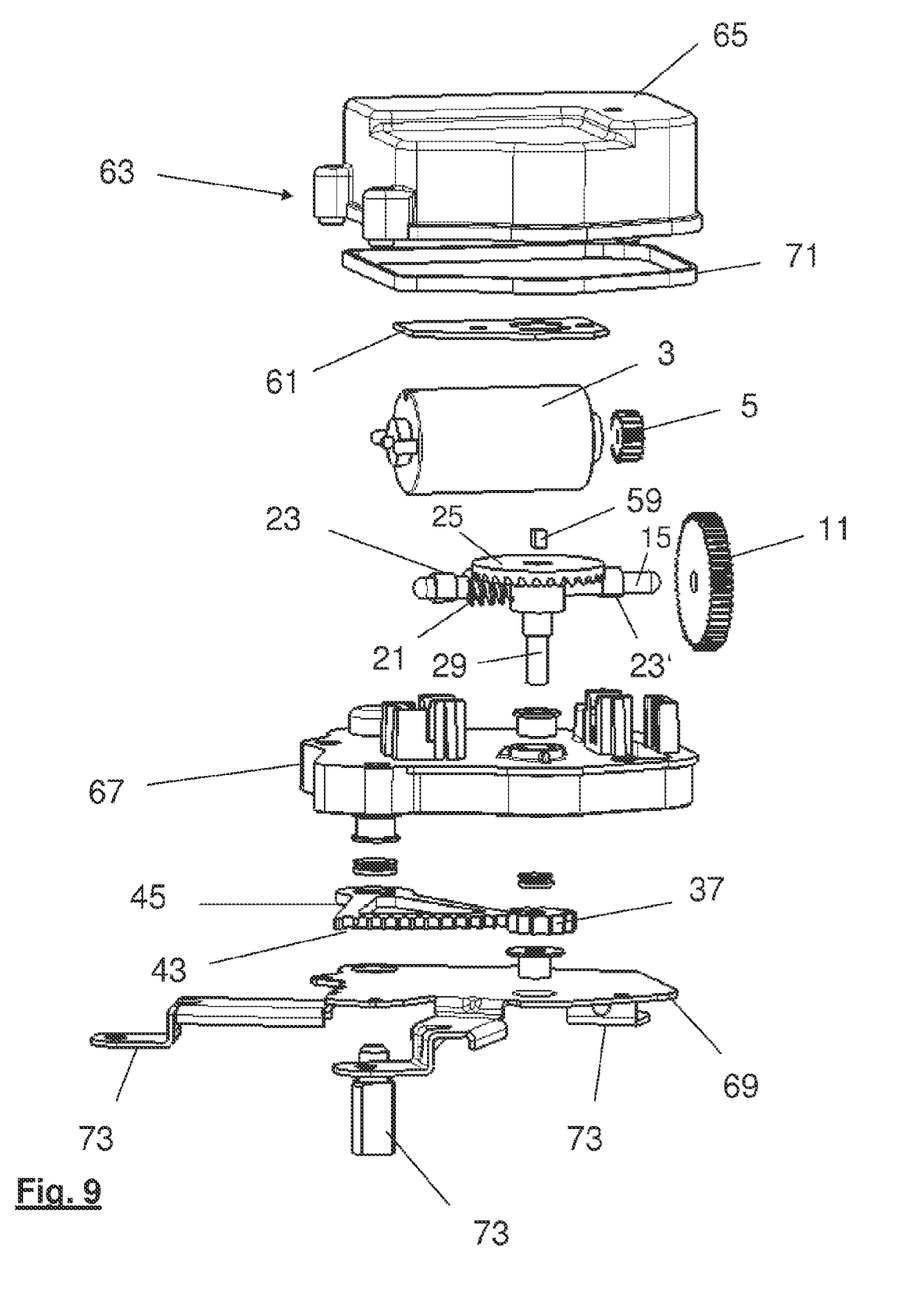
FIG. 9 shows an exploded view of the exemplary embodiment of a rotary shift actuator.

The exemplary embodiment of a rotary shift actuator 1 can be arranged in a housing 63. The housing includes a cover 65, a central element 67, a base 69 and a gasket or sealing 71, for sealing the central element 67 to the cover 65. The base 69 a mounting mechanism configured to mount the exemplary rotary shift actuator 1 to a transmission. In the sealed compartment formed between in cover 65 and the central element 67 by the sealing 71 all electronic devices like the electronic compass 61 and the electric motor 3 of the rotary shift actuator 1 are protected from all environmental stress like dirt, grease or water.

Figure 10:
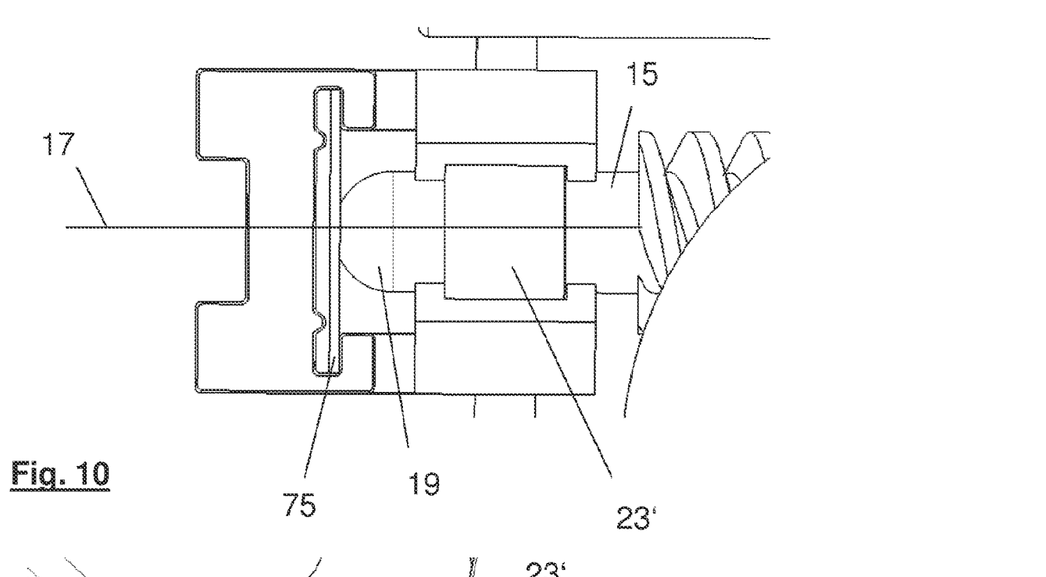
FIG. 10 shows details of a mounting of a first shaft of the exemplary embodiment of a rotary shift actuator.
Figure 11:
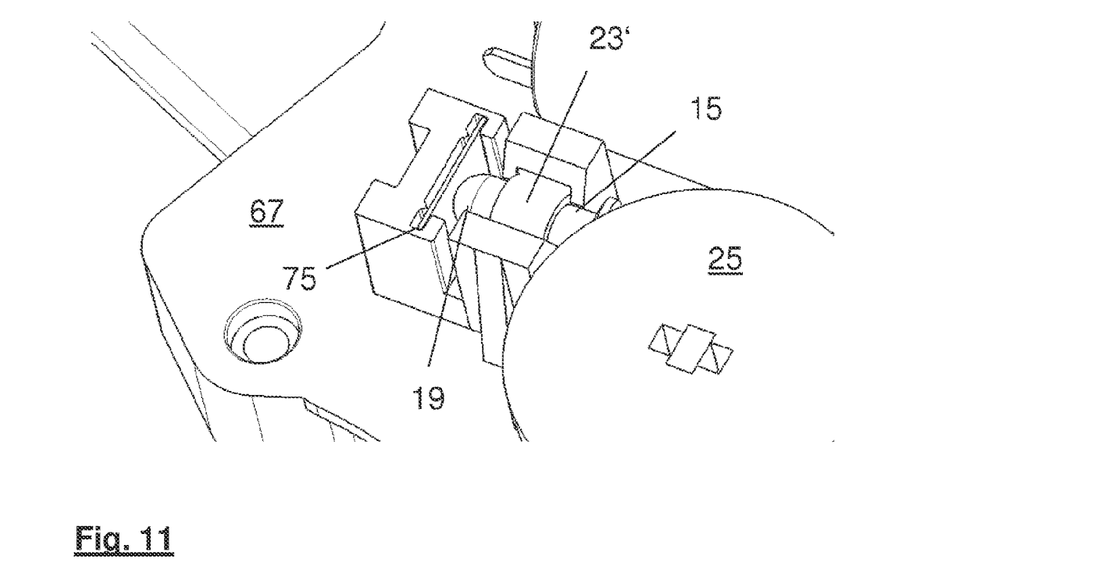
FIG. 11 shows the mounting of the first shaft from another perspective and FIG. 12 shows elements of the exemplary embodiment of a rotary shift actuator arranged on a central element of a housing according to the present invention.

In FIGS. 10 and 11 the mounting of the first shaft 15 is shown in more detail. The shaft 15 is of a cylindrical shape and mounted in a tubular bushing 23'. The second end 19 of the first shaft 15 abuts a resilient element 75. The resilient element 75 is formed as a plate spring 75 that extends in a plane perpendicular to the first axis 70. The cupola shape of the second end 19 is advantageous, as it minimises the friction between the second end 19 of the first shaft 15 and the resilient element 75. The resilient element 75 is advantageous, as the first shaft 15 can be slightly displaced along the first axis 17 when a force acts onto the first shaft 15 tending to displace the first shaft 15 in a direction along the first axis 17. When the force is not acting on the first shaft 15 anymore, the resilient element 25 pushes the first shaft 15 back into a central or neutral position.

Figure 12:
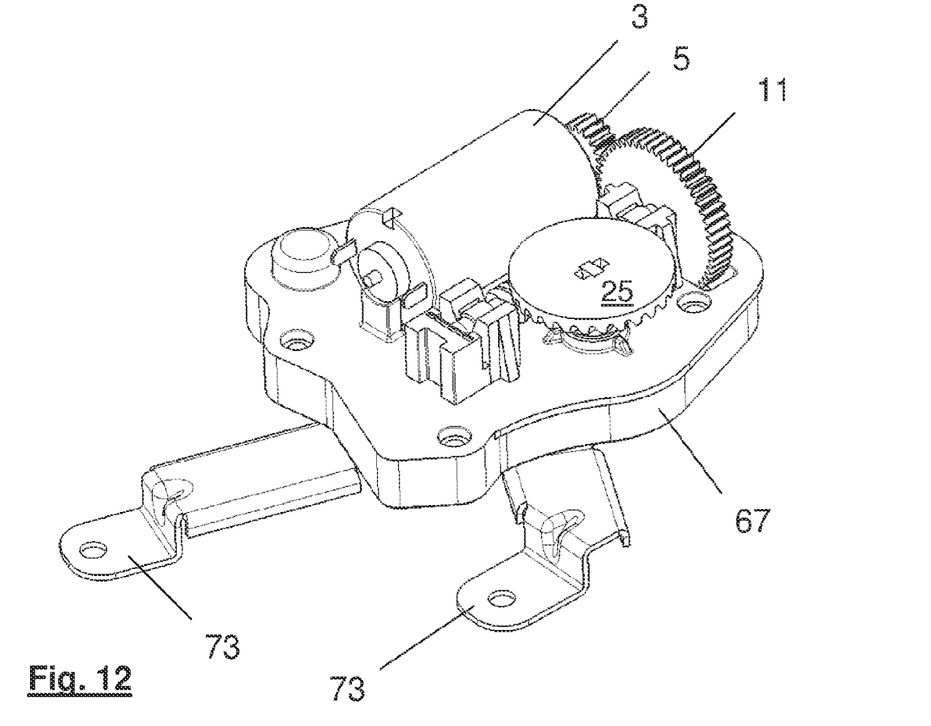

Finally, FIG. 12 shows an arrangement of the motor 3, the motor spur gear 5, the first shaft 15 and the second shaft 29 with respect to the central element 67 of the housing 63.

The invention claimed is:

1. A rotary shift actuator for a shift-by-wire transmission comprising:
   a motor having a motor shaft that is rotatable about a motor axis;
   an output head arranged towards a second end of an output lever and adapted for connection with a shift shaft of a transmission; and
   a gear train for transferring torque from the motor shaft to the output head;
   wherein the gear train comprises a first shaft rotatable about a first axis a second shaft rotatable about a second axis and the output lever pivotable about a lever axis;
   wherein the gear train further comprises a plurality of torque transmitting mechanisms;
   wherein a respective one of the torque transmitting mechanisms is configured to transmit torque from the motor shaft to the first shaft, from the first shaft to the second shaft and from the second shaft to the output lever;

wherein the torque transmitting mechanism that is configured to transmit torque from the first shaft to the second shaft is formed as a worm gear;

wherein the motor axis extends parallel to the first axis and perpendicular to the second axis and the second axis extends parallel to the lever axis, with the second axis being spaced from the lever axis;

wherein the torque transmitting mechanism that is configured to transmit torque from the motor shaft to the first shaft is formed by a motor spur gear attached to the motor shaft and a first spur gear attached to the first shaft, and the first spur gear is in meshing engagement with the motor spur gear; and wherein the first shaft is mounted in two bushings, such that the first shaft can be displaced in the direction of the first axis.

2. Rotary shift actuator according to claim 1, wherein the motor axis and the first axis are arranged between the second axis and the lever axis and in that the first axis is arranged between the motor axis and the second axis.

3. Rotary shift actuator according to claim 1, wherein the worm gear is formed by a cylindrical pinion gear attached to the first shaft and a crown gear attached to the second shaft, and the crown gear is in meshing engagement with the cylindrical pinion gear.

4. Rotary shift actuator according to claim 1, wherein the torque transmitting mechanism that is configured to transmit torque from the second shaft to the output lever is formed by a toothed end face formed at a first end of the output lever and a second spur gear attached to the second shaft, and the toothed end face is in meshing engagement with the second spur gear.

5. Rotary shift actuator according to claim 4, wherein the second spur gear is a variable radius gear, and the toothed end face is arranged on a variable radius about the lever axis, such that the distance between the second axis and the lever axis is constant when rotating the second shaft and pivoting the output lever while the variable radius gear and the toothed end face remain in meshing engagement with one another.

6. Rotary shift actuator according to claim 5, wherein the variable radius gear has a first section having the smallest radius and a second section having the largest radius, and the first and the second sections are arranged adjacent to one another, and the radius of the variable radius gear increases from the first section to the second section.

7. Rotary shift actuator according to claim 6, wherein a gear catch is formed by a step on the variable radius gear, and the first section and the second section are adjacent to one another;

in that output lever includes a side face and an elongated tooth on the toothed end face, and the side face and the elongated tooth delimit the toothed end face on opposing sides;

wherein the gear catch, the elongated tooth and the side face are arranged, such that the gear catch engages with the side face, when the first section engages with the toothed end face, and such that the gear catch engages with the elongated tooth, when the second section engages with the toothed end face, thereby delimiting a rotation of the second shaft.

8. Rotary shift actuator according to claim 1, wherein the first shaft is of a cylindrical shape and each one of the two bushings are tube-shaped.

9. Rotary shift actuator according to claim 8, wherein at least one of a first and a second end of the first shaft is arranged adjacent to and spaced apart from at least one of a first resilient element and a second resilient element, such that the first shaft is movable back into a central position by one of the first resilient element and the second resilient element when the first shaft is displaced along the first axis towards one of the first resilient element and the second resilient element.

10. Rotary shift actuator according to claim 9, wherein the first resilient element is formed as a first plate spring, and at least one of the first plate spring extends in a plane perpendicular to the first axis and the second resilient element is formed as a second plate spring, wherein the second plate spring extends in a plane perpendicular to the first axis.

11. Rotary shift actuator according to claim 1, wherein at least one of the first end and the second end of the first shaft is cupola shaped.

12. Rotary shift actuator according to claim 1, wherein the rotary shift actuator is arranged in a housing, and the housing includes a cover, a central element and a base, and the cover is sealed to the central element by a gasket.

13. Rotary shift actuator according to claim 1, further comprising a magnet mounted onto an end of the second shaft, and the magnet is arranged such that the poles of the magnet extend along an axis perpendicular to the second axis and in that the rotary shift actuator includes a device for sensing the orientation of the magnet.

* * * * *